(12) United States Patent
Smith et al.

(10) Patent No.: US 8,801,060 B1
(45) Date of Patent: Aug. 12, 2014

(54) MANUAL LIFT ASSISTANCE APPARATUS

(76) Inventors: Thomas H. Smith, York, ME (US);
Richard Edgerly, Newmarket, NH (US)

(*) Notice: Subject to any disclaimer, the term of this patent is extended or adjusted under 35 U.S.C. 154(b) by 0 days.

(21) Appl. No.: 13/593,414

(22) Filed: Aug. 23, 2012

Related U.S. Application Data (60) Provisional application No. 61/636,223, filed on Apr. 20, 2012.

(51) Int. Cl.
*B65G 7/12* (2006.01)

(52) U.S. Cl.
USPC .............................. 294/15; 294/26; 294/902

(58) Field of Classification Search
USPC ................ 294/15, 26, 175, 902, 210, 211
See application file for complete search history.

(56) References Cited

U.S. PATENT DOCUMENTS

| | | | | |
|---|---|---|---|---|
| 1,334,510 | A * | 3/1920 | Waterbury | 294/26 |
| 2,430,142 | A * | 11/1947 | Roberts | 294/168 |
| 4,190,278 | A * | 2/1980 | Jancik, Jr. | 294/26 |
| 4,580,825 | A * | 4/1986 | Johnson | 294/24 |
| 4,968,049 | A * | 11/1990 | Johnson | 280/47.24 |
| 5,171,052 | A * | 12/1992 | Cunningham | 294/210 |
| 5,257,843 | A * | 11/1993 | Nunn | 294/15 |
| 6,186,566 | B1 * | 2/2001 | Frederickson | 294/15 |
| 6,241,297 | B1 * | 6/2001 | Miller et al. | 294/15 |
| 7,309,088 | B2 * | 12/2007 | Fiore et al. | 294/24 |

* cited by examiner

*Primary Examiner* — Dean Kramer
(74) *Attorney, Agent, or Firm* — Lorusso & Associates (57) ABSTRACT

A carry-assist apparatus for moving heavy, cumbersome objects. The apparatus has a handle segment, an adjustable shaft segment and a hook segment, each segment of which is configured and dimensioned to permit the assembly of a spatially variable carry-assist apparatus. The hook segment is formed with a bottom having a bottom end to which optional nubs may be secured to provide positive, secure engagement to the object being lifted.

13 Claims, 11 Drawing Sheets

MANUAL LIFT ASSISTANCE APPARATUS

CROSS REFERENCE TO RELATED APPLICATION

A claim of priority is made to U.S. Provisional Application Ser. No. 61/636,223, filed Apr. 20, 2012, the contents of which are incorporated in their entirety by reference.

FIELD OF THE DISCLOSURE

This disclosure relates to apparatus for lifting heavy, dimensionally cumbersome objects. The apparatus provides an ergonomically safe, secure means to move objects such as large doors and windows without harming the object. More particularly, the disclosure relates to hand-held apparatus to facilitate the movement and transportation of large objects that have finished surfaces subject to marring, denting and other superficial damage when moved.

BACKGROUND OF THE DISCLOSURE

Solid core doors, such as those made from hard woods and composites, large windows and other large objects such as furniture often are moved manually. The nature of these objects requires careful transportation to ensure object surfaces are not marred or damaged when moved. Unfortunately, the dimensions and weight of these objects often make them difficult to grasp, lift and move without assistance. Additional obstacles are the surfaces over which the objects are moved. For example, doors and furniture may have to be moved up or down stairs, over driveway and construction site terrain that often has multiple obstacles to traverse and negotiate. All of these obstacles make it even more difficult to move large, heavy, cumbersome objects without some form of assistance.

Many different approaches have been taken to facilitate the movement of large objects, but each has its own shortcomings and problems. One approach is to use straps to extend the reach of one's arms. Straps do extend reach, but due to the nature of strap material, it is not easy to stabilize the object being moved as the straps lack rigidity in multiple axes. This is a particular problem when moving large objects up or down stairs. The object will have a tendency to swing into less than optimal carrying positions due to the force of gravity.

Figure 2:
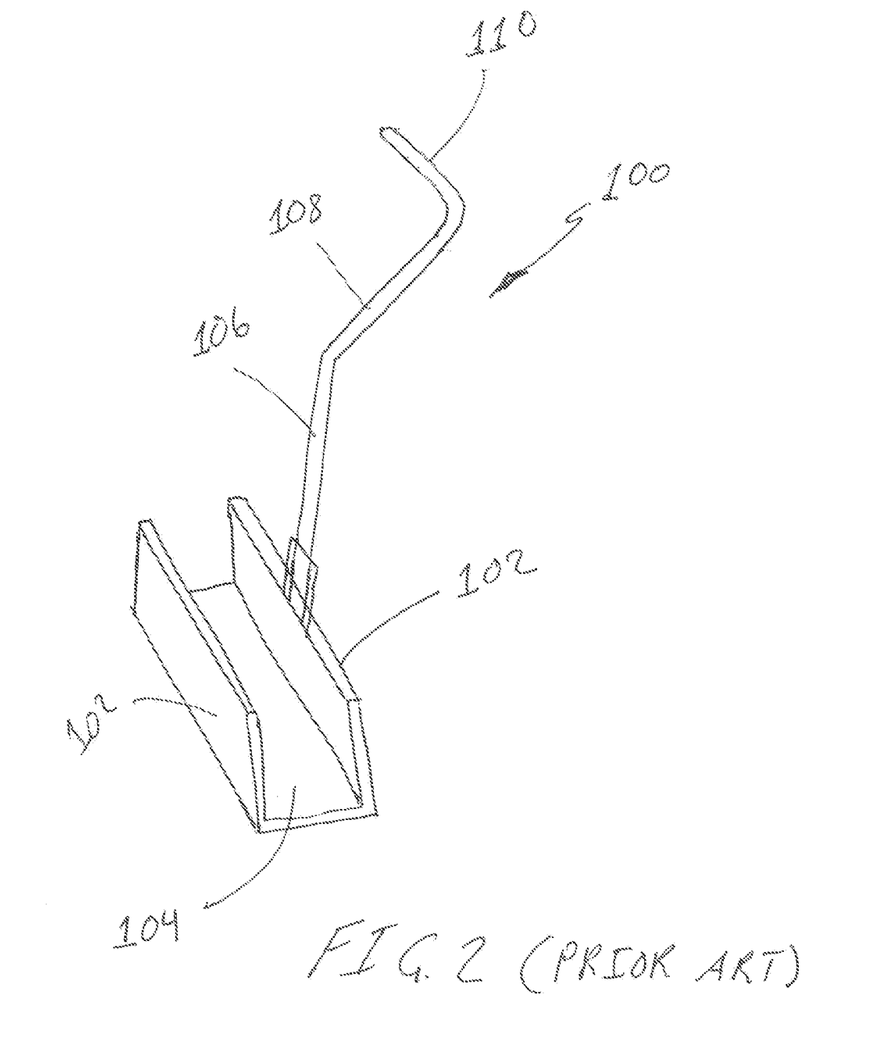
FIG. 2 is a top side perspective view of a prior art carry-assist apparatus.

FIG. 2 shows another approach. The panel carrier apparatus, shown generally as 100, includes a "square-U" shaped trough having a bottom 104 and sides 102. The ends of the trough are open to permit reception of elongate sheet materials, such as sheet rock or plywood sheathing. A shaft 106 oriented substantially vertical to the plane occupied by the trough is attached to side wall 102. A distal portion 108 of shaft 106 is offset to extend away from the trough to allow clearance from any sheet goods carried in the trough. A handle 110 extends from distal portion 108 along a plane substantially parallel to a plane occupied by the trough. The carrier is dimensioned to extend arm reach so as to facilitate the transport of large sheet materials.

The panel carrier does provide assistance to carry sheet materials, but has significant disadvantages. First, it is not structured to protect the finish on objects such as doors and windows. The edges of the trough are prone to cause dents and cuts as the item is placed in the trough. This is not a consideration for sheet materials that are either buried, or subject to further finishing. The shaft length is not adjustable. As such, the apparatus does not accommodate different arm lengths and heights that can impact the ergonomic aspects of the apparatus. Moreover, the substantially orthogonal relationship between the trough bottom and trough sides and the length of the trough does not permit the trough to be urged under the object in a horizontal orientation and then rotated into an upright carrying position without creating contact by the object with the top edge of the side distal from the shaft. This creates the possibility of marring the objects surface. The nature of the trough limits the objects that can be carried without causing any damage to the object. The structure of the trough substantially limits the apparatus' use to carry sheet-like goods.

Figure 3:
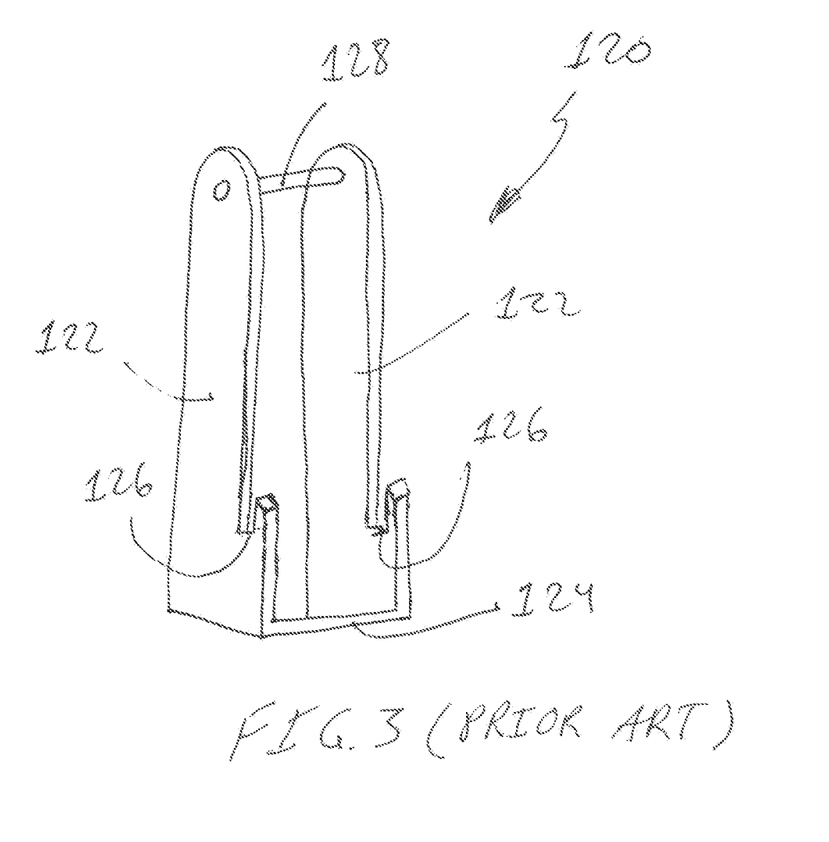
FIG. 3 is a front perspective view of another prior art carry-assist apparatus.

FIG. 3 shows another type of carry-assist apparatus. The apparatus, shown generally as 120, includes a pair of substantially parallel sides 122 connected by a bottom 124 and a handle 128. Each side has portions defining a slot 126 dimensioned and configured to receive the edge of a piece of sheet material, such as plywood. This apparatus has disadvantages similar to those of the prior described apparatus. The design of apparatus 120 does not lend itself to insertion under the object to be carried. Its structure requires the object to be placed in the slot. Apparatus 120 also is not adjustable. The spatial orientation to, and distance of handle 128 from, slots 126 are fixed. The structure of the slots further limit the objects that can be carried to those presenting a relatively narrow edge, which is to be expected for an apparatus designed to assist movement of sheet goods.

Figure 4:
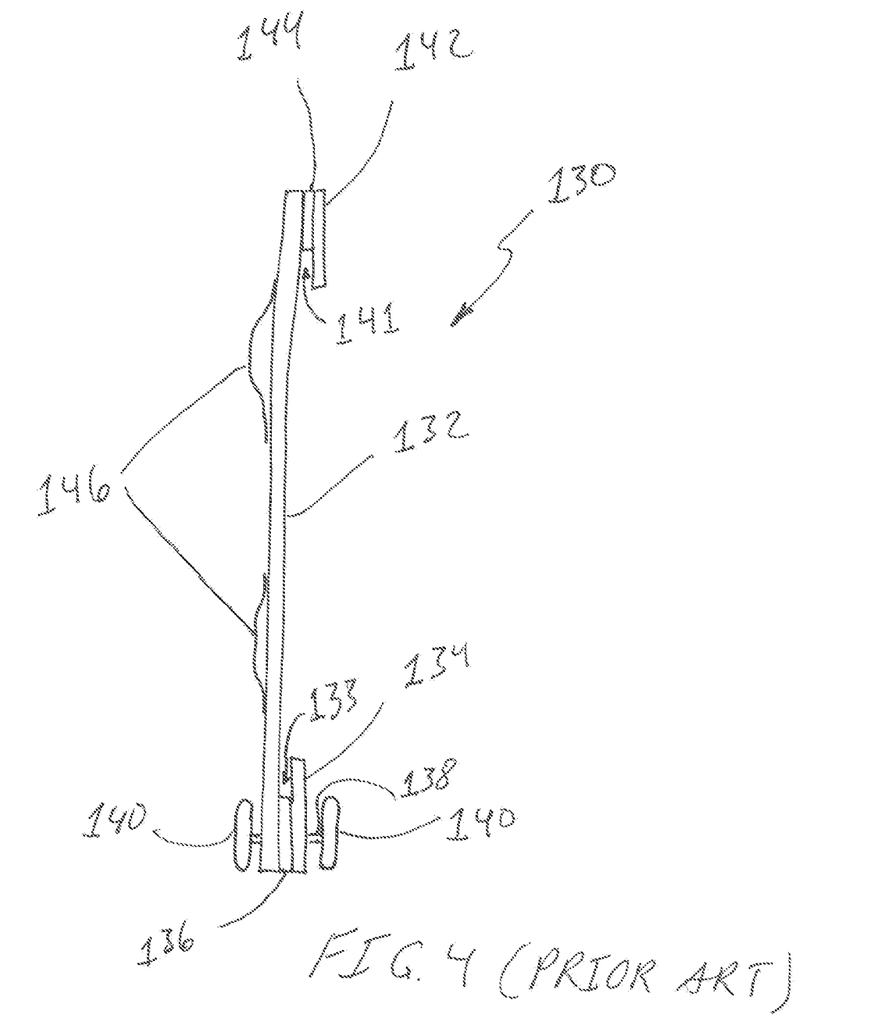
FIG. 4 is a side elevational view of a further prior art carry-assist apparatus.

FIG. 4 shows yet another form of carry-assist apparatus. Shown generally as 130, the apparatus is configured to also assist with the movement of sheet materials such as sheet rock. Apparatus 130 includes an elongate main shaft 132. A lower slot 133 is formed by the combination of a lower insert 136 and a lower slot wall 134 secured to a lower end of shaft 132. An axle 138 is secured through the lower end of the apparatus. Wheels 140 are secured to the ends of axle 138. An upper slot 141 is formed by the combination of an upper insert 144 and an upper slot wall 142 secured to an upper end of shaft 132. A pair of handles 146 secured to shaft 132 provides a means to hold the apparatus while in use. The apparatus is operated by sliding a piece of sheet material between the slots. The sheet is then rolled to its intended location.

As with the other prior art devices, there are considerable disadvantages to this apparatus. Apparatus 130 is not adjustable. The shaft length is not adjustable. As such, the apparatus does not accommodate different arm lengths and heights that can impact the ergonomic aspects of the apparatus. To be effective, it has to be dimensioned to space the slots to receive specifically sized pieces of sheet material. Because it is fitted with wheels, the sheet has to be moved in a substantially vertical orientation. This requires the user to not only urge the sheet forward, but must do so while maintaining the vertical orientation to prevent the apparatus from veering off the intended path of travel. The substantially orthogonal relationship between the bottom trough and the plane occupied by the wheels does not permit the trough to be urged under the object in a horizontal orientation and then rotated into an upright carrying position without creating contact with the object by the top edge of the slot wall 134. This creates the possibility of marring the objects surface. The structure of the slots further limits the objects that can be carried to those presenting a relatively narrow edge, which is to be expected for an apparatus designed to assist movement of sheet goods.

Figure 5:
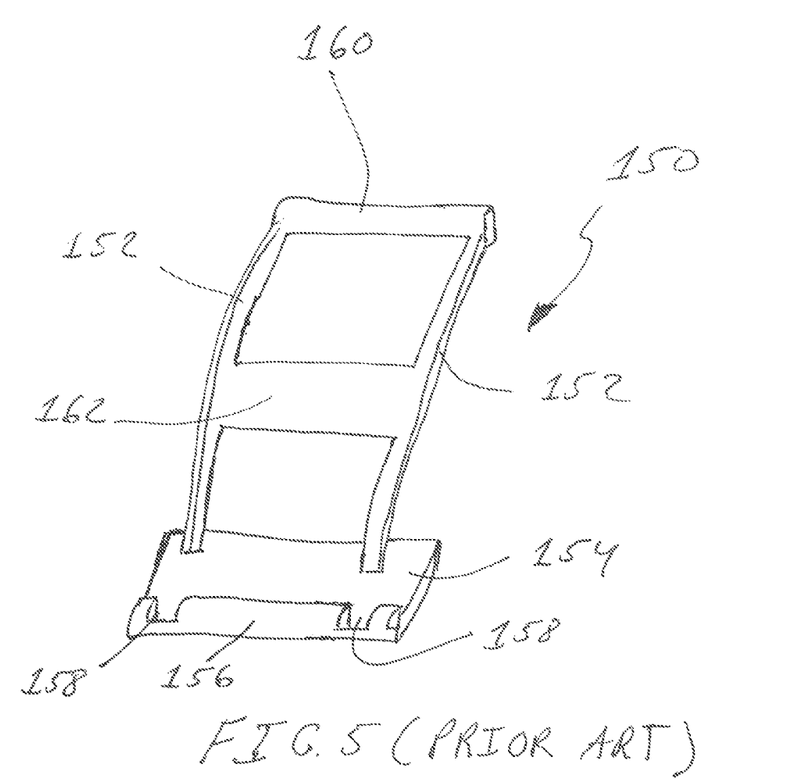
FIG. 5 is a front perspective view of a yet further prior art carry assist apparatus.

A yet further example of carry-assist apparatuses is shown in FIG. 5. Shown generally as 150, the apparatus has a fixed structure configured and dimensioned to facilitate the movement of long, wide and substantially flat sheet goods. The apparatus includes a pair of substantially parallel shafts 152 secured to a support platform 154. Platform 154 includes a raised shoulder 156 extending from an end of the platform opposite the end to which shafts 152 are attached. A pair of slots 158 are formed in shoulder 156. A handle 160 is secured to the top ends of shafts 152. A spacer 162 is secured or formed between shafts 152. The combination of shoulder 156, the portion of platform 154 between the shoulder and the shafts and the surfaces of shafts 152 opposite shoulder 156 form a large trough. Shafts 152 are curved away from a plane orthogonal to the plane occupied by platform 154 to presumably provide hand/arm clearance when in use.

To use apparatus 150, the object to be lifted is placed on the top surface of platform 154 between shoulder 156 and shafts 152. The offset handle permits the user to grasp the apparatus and lift the object for transportation. Like the other apparatuses, apparatus 150 also presents distinct disadvantages. The static construction lacks adjustability. Although it extends the user's reach, it does not account for different user heights and arm lengths. The apparatus construction further limits how the apparatus can be mated to the object. The apparatus cannot be rotated under the object in a horizontal orientation and then rotated into an upright orientation due to the elongate configuration of platform 154.

What is needed is a carry-assist apparatus that adjusts for different user heights and arm lengths to provide a safe, effective and ergonomically superior lift-assist device. What is also needed is a carry-assist apparatus that permits access to the intended object in a manner that reduces or eliminates the possibility of damaging or marring the surface of the object when moved with the assistance of the apparatus. These and other objects of the disclosure will become apparent from a reading of the following summary and detailed description of the disclosure.

SUMMARY OF THE DISCLOSURE

In one aspect of the disclosure, an adjustable carry-assist apparatus includes a handle segment secured to an adjustable shaft segment at one end of the shaft segment. A hook segment is secured to the second end of the adjustable shaft segment. An end of the hook segment may include one or more energy dispersion elements to displace the force imparted on the hook segment by an object being carried by the apparatus. Additional embodiments of the three main apparatus components provide additional variability to handle different lifting conditions and situations.

In a further aspect of the disclosure, a carry-assist apparatus includes a multi-prong hook segment configured to provide lateral stability when lifting large cumbersome objects. The hook end is configured to permit engagement with objects in a manner to prevent or significantly reduce any damage to the object being lifted.

In a still further aspect of the disclosure, a security strap is secured to the ends of the carry-assist apparatus to provide an additional degree of safety when lifting large, dimensionally cumbersome objects. These and other aspects of the disclosure will become apparent from a review of the appended drawings and a reading of the following detailed description of the disclosure.

DETAILED DESCRIPTION OF THE DISCLOSURE

Figure 1:
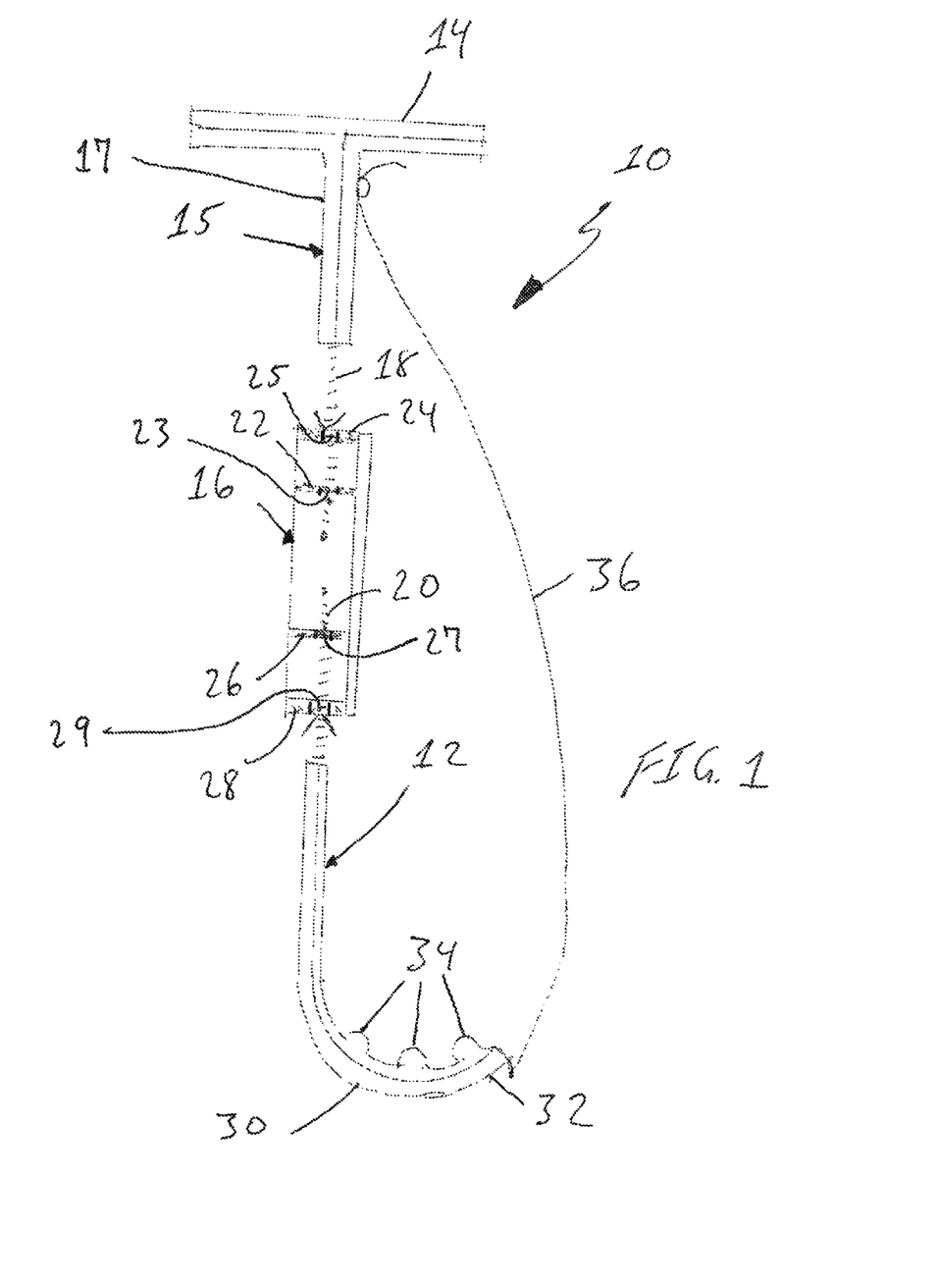
FIG. 1 is a side elevational view in partial phantom of an adjustable carry-assist apparatus according to one embodiment of the disclosure.

Referring to FIG. 1, a carry-assist apparatus shown generally as 10, includes a hook segment, shown generally as 12, having a radiused bottom 30 with an end 32 configured to extend above the lowest point of bottom 30. The orientation of end 32 to bottom 30 provides an object reception surface that stabilizes the object on the apparatus when engaged with the apparatus. End 32 creates an opposing surface to the surface created by the transition from the elongate shaft portion to the radisued bottom 30. The angle formed by the centerlines of bottom 30 and end 32 may be from about 5° to about 60° and more specifically from about 15° to about 30°.

Extending from, or formed on, a top surface of bottom 30 is one or more force dispersing nubs 34. Nubs 34 may be formed from compressible, resilient materials, such as rubber, neoprene and like materials. Nubs 34 function to disperse the force of gravity derived from the placement of an object on hook segment 12. The material used has the additional advantageous effect of not damaging surfaces, particularly finished surfaces, on the object being carried while providing a friction-generating surface to maintain registration with a particular section of the object being carried.

A top end of hook segment 12 has portions defining a threaded hook segment rod 20 dimensioned and configured to be received in a shaft segment, shown generally as 16. Shaft segment 16 is substantially conformed to the shape of a cylinder although the exterior surface may be configured as any regular or irregular geometric shape in cross section. For example, the exterior surface may be formed as an octagon or a hexagon in cross section to permit rotation with hand operated implements such as wrenches and the like. Segment 16 includes a first hook insert 26 secured to, or formed on, an inner wall of the segment distal from a bottom end of the segment. Insert 26 has portions defining a threaded bore 27 configured and dimensioned to receive and engage the threads of rod 20. Segment 16 further includes a second hook insert 28 secured to, or formed on, the inner wall of the segment proximal to the bottom end of segment 16. Similar to insert 26, second insert 28 has portions defining a second bore 29 formed with threading configured to receive and mate with the threading of rod 20.

The use of the spaced threaded inserts ensures two contact points between hook segment 12 and shaft segment 16 that maintains the alignment of segment 12 to segment 16. The spacing of the inserts can be modified to alter the strength of the alignment effect. Greater spacing results in stronger alignment. This may be of particular importance when lifting relatively heavy loads that may impart multiple force vectors in multiple planes.

Shaft segment 16 further includes a first handle insert 22 secured to, or formed on, the inner wall of the segment distal from a top end of the segment. Insert 22 has portions defining a threaded handle bore 23 configured and dimensioned to receive and engage the threads of a threaded handle rod 18 further disclosed below. Segment 16 further includes a second handle insert 24 secured to, or formed on, the inner wall of the segment proximal to the top end of segment 16. Similar to insert 22, second handle insert 24 has portions defining a second handle bore 25 formed with threading configured to receive and mate with the threading of rod 20. The handle inserts are also spaced to perform an alignment function similar to that performed by the hook inserts.

Figure 16:
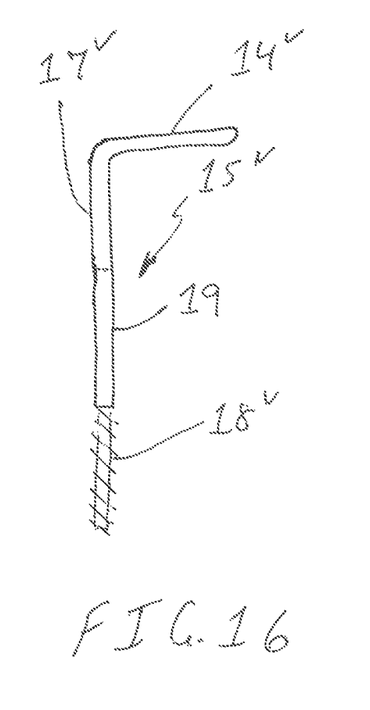
FIG. 16 is a front elevational view of the handle segment shown in FIG. 15.

Apparatus 10 further includes a handle segment, shown generally as 15, having a handle shaft 17 and a handle 14 secured to, or integral with, shaft 17. Extending from an end opposite the shaft end to which the handle is connected is handle segment rod 18. Rod 18 is threaded and configured to engage the threading of handle inserts 22 and 24. Handle 14 can be configured to form a "T" with shaft 17 (as shown in FIG. 1), or may be offset relative to shaft 17 such as shown in FIG. 16 described more fully below.

To add an additional level of safety, an optional safety strap 36 may be secured via eyelets and looped ends, or other comparable means, to end 32 at one end of the strap, and to handle shaft 17 at a second end of the strap. Releasable clasps and clips as are well known in the art may also be used to releasably secure strap 36 to apparatus 10. To use strap 36, the strap is positioned about the object to be lifted after the object is engaged with Apparatus 10

It should be understood that in alternate embodiments, either handle segment 14 and shaft segment 16, or hook segment 12 and shaft segment 16 may be combined into a single fixed piece. If the handle segment and the shaft segment are fixed, the shaft segment portion of the combined fixed segment will still have threaded inserts to receive a threaded hook segment to impart adjustability. If the hook segment and the shaft segment are fixed, the shaft segment portion will still have inserts to receive a threaded handle segment to impart adjustability.

Figure 6:
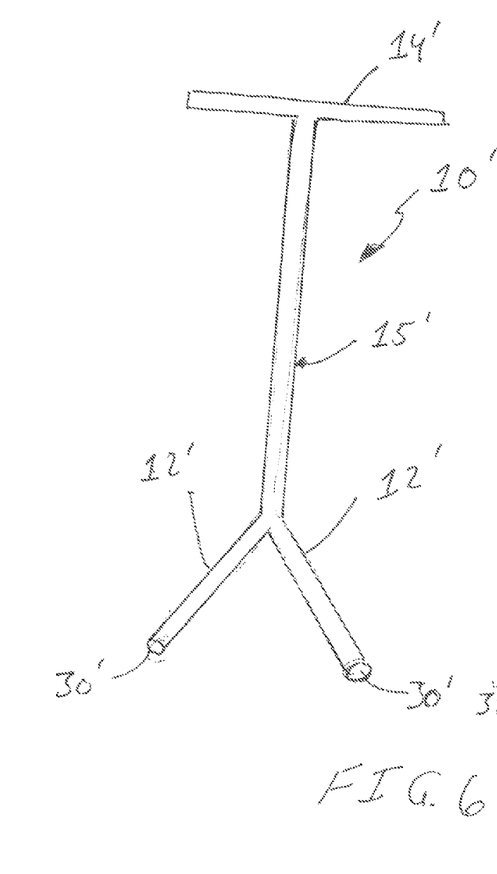
FIG. 6 is a back elevational view of a carry-assist apparatus according to another embodiment of the disclosure.
Figure 7:
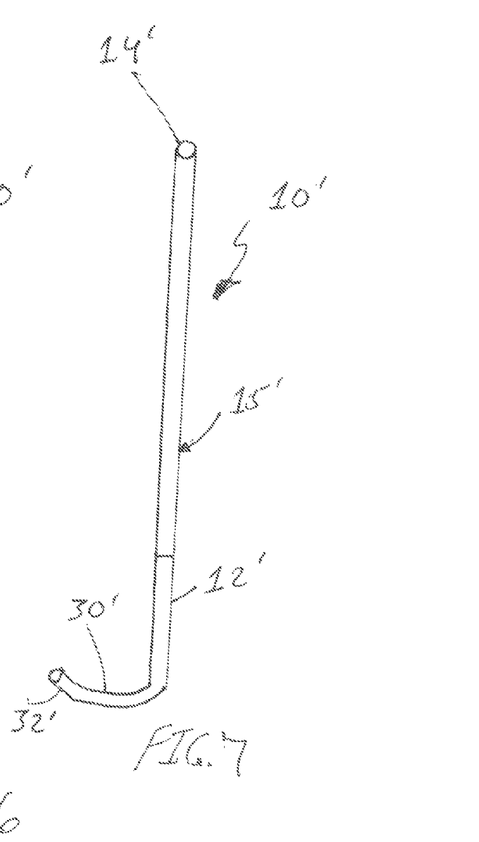
FIG. 7 is a side elevational view of the carry-assist apparatus shown in FIG. 6.

Referring now to FIGS. 6 and 7, in another aspect of the disclosure, a carry-assist apparatus, shown generally as 10', includes an apparatus shaft 15' that forms the main element of the apparatus. It should be understood that elements referenced with primed numbers in one embodiment correspond to elements in other embodiments with the same unprimed or differently primed numbers. At least one hook segment 12' extends downwardly from shaft 15'. Embodiments having two hook segments or tines 12' (as shown in FIG. 6), have the hook segments diverging downwardly from shaft 15' at angles substantially equidistant from the plane occupied by shaft 15'. It should be understood the divergence angles of the tines do not have to be substantially identical, but may be altered to accommodate unique lifting conditions that require offset, non-identical tines.

A radiused bottom 30' extends substantially laterally from the plane occupied by hook segments 12'. A distal end of bottom 30', bottom end 32', is configured to extend above the lowest point of bottom 30'. The orientation of end 32' to bottom 30' provides an object reception surface that stabilizes the object on the apparatus when engaged with the apparatus. End 32' creates an opposing surface to the surface created by the transition from the elongate shaft portion 15' to the radiused bottom 30'. Optional nubs (not shown), such as those shown in FIG. 1 may be secured to, or formed on, a top surface of bottom 30' and end 32' so as to provide the same advantages and benefits disclosed for bottom 30 and end 32.

A handle 14' is formed on, or secured to, a top end of shaft 15'. The combination of handle 14' and shaft 15' may form a "T" configuration, or handle 14' may be offset relative to shaft 15' such as is shown in FIG. 16. Optional friction material (not shown), such as rubber, may be secured to handle 14' to improve grip.

Figure 8:
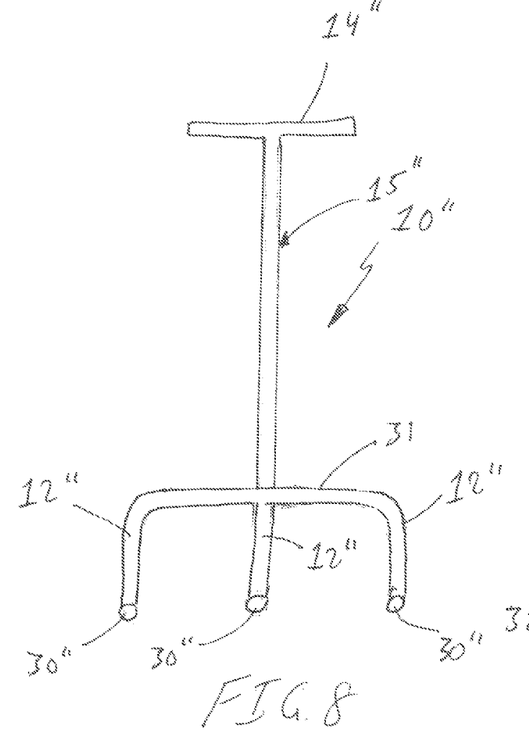
FIG. 8 is a back elevational view of a carry-assist apparatus according to a further embodiment of the disclosure.
Figure 9:
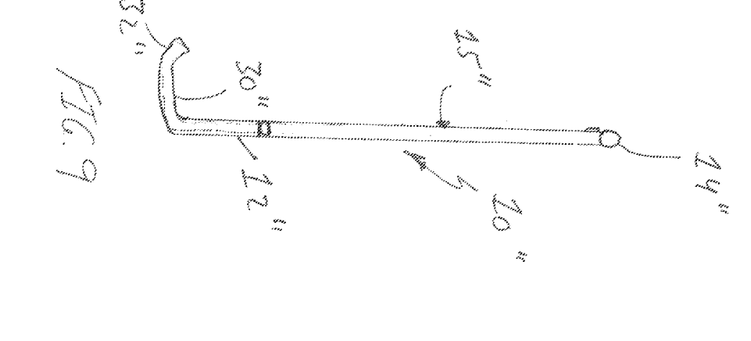
FIG. 9 is a side elevational view of the carry-assist apparatus shown in FIG. 8.

Referring now to FIGS. 8 and 9, in a yet further aspect of the disclosure, a multi-prong carry-assist apparatus, shown generally as 10", includes an elongate main shaft 15". A plurality of prongs 12" extend from a substantially horizontally oriented prong support 31 secured to a distal end of shaft 15". Distal ends of prongs 12" are configured to form radiused bottoms 30". Distal ends of bottoms 30", bottom ends 32", are configured to extend above the lowest points of bottoms 30". The orientation of ends 32" to bottoms 30" provides an object reception surface that stabilizes the object on the apparatus when engaged with the apparatus. Like end 32' of apparatus 10', ends 32" create opposing surfaces to the surfaces created by the transitions of the elongate portions of prongs 12" to the radiused bottoms 30". The angles formed by the centerlines of bottoms 30" and ends 32" are same as those for bottom 30 and end 32. Optional nubs (not shown), such as those shown in FIG. 1 may be secured to, or formed on, top surfaces of bottoms 30" and ends 32" so as to provide the same advantages and benefits disclosed for bottom 30 and end 32.

A handle 14" is formed on, or secured to, a top end of shaft 15". The combination of handle 14" and shaft 15" may form a "T" configuration, or handle 14" may be offset relative to shaft 15" such as is shown in FIG. 16. Optional friction material (not shown), such as rubber or tacky polymer materials in a variety of thicknesses and surface configurations (waffle, diamond pattern, hexagon patterns and the like), may be secured to handle 14" to improve grip.

Figure 10:
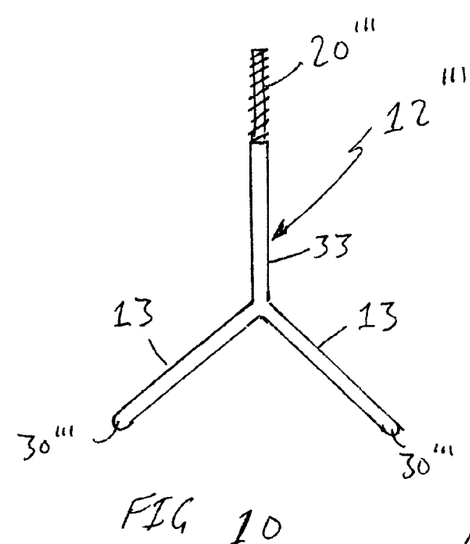
FIG. 10 is a back elevational view of a hook segment for an adjustable carry-assist apparatus according to a yet further embodiment of the disclosure.
Figure 11:
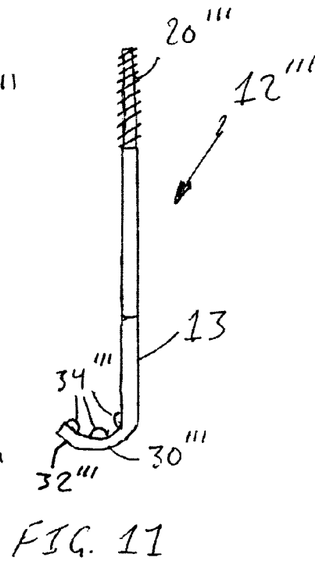
FIG. 11 is a side elevational view of the hook segment shown in FIG. 10.

Referring now to FIG. 10, a modular hook segment is shown generally as 12'''. In the embodiment shown, two prongs 13 diverge downwardly from a main shaft section of segment 12''' at angles substantially equidistant from the plane occupied by segment 12'''. Each prong 13 has a radiused bottom 30''' that extends substantially laterally from the plane occupied by the main shaft of each prong 13. A distal end of bottom 30''', bottom end 32''', is configured to extend above the lowest point of bottom 30'''. The orientation of end 32''' to bottom 30''' provides an object reception surface that stabilizes the object on the apparatus when engaged with the apparatus. End 32''' creates an opposing surface to the surface created by the transition from the elongate shaft portion of prong 13 to the radiused bottom 30'''. The angles formed by the centerlines of bottoms 30''' and ends 32''' are same as those for bottom 30 and end 32. Optional nubs 34''' may be secured to, or formed on, the top surfaces of bottoms 30''' and ends 32''' so as to provide the same advantages and benefits disclosed for bottom 30 and end 32.

Figure 12:
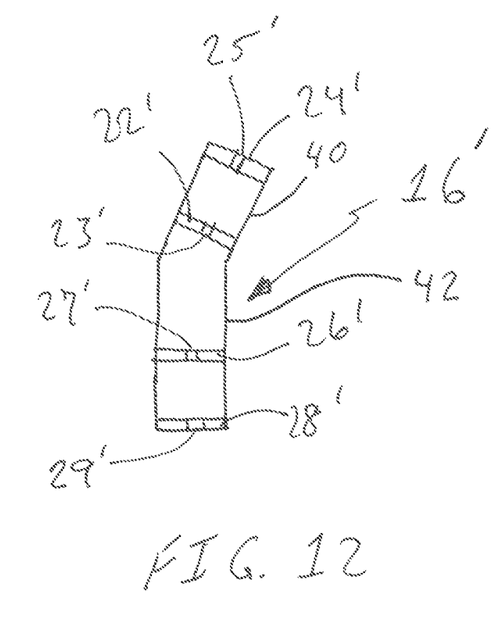
FIG. 12 is a side elevational view of an adjustable carry-assist shaft segment according to a still further embodiment of the disclosure.

Referring now to FIG. 12, in a yet further aspect of the disclosure, a modified shaft segment, shown generally as 16', imparts additional advantages by including sections that occupy intersecting planes. A first section 40 is substantially conformed to the shape of a cylinder although the exterior surface may be configured as any regular or irregular geometric shape in cross section. For example, the exterior surface may be formed as an octagon or a hexagon in cross section to permit rotation with hand operated implements such as wrenches and the like.

First section 40 includes a first handle insert 22' secured to, or formed on, an inner wall of the section distal from a top end of the segment. Insert 22' has portions defining a threaded bore 23' configured and dimensioned to receive and engage the threads of a handle rod, such as handle rod 18. Section 40 further includes a second handle insert 24' secured to, or formed on, the inner wall of the segment proximal to the top end of section 25'. Similar to insert 22', second insert 24' has portions defining a second bore 25' formed with threading configured to receive and mate with the threading of, for example, handle rod 18.

The use of the spaced threaded inserts ensures two contact points between a handle segment, such as handle segment 15 and shaft segment 16' that maintains the alignment of segment 15 to segment 16'. The spacing of the inserts can be modified to alter the strength of the alignment effect. Greater spacing results in stronger alignment. This may be of particular importance when lifting relatively heavy loads that may impart multiple force vectors in multiple planes.

Shaft segment 16' further includes a second section 42 substantially conformed to the shape of a cylinder although the exterior surface may be configured as any regular or irregular geometric shape in cross section. Like first section 40, the exterior surface may be formed as an octagon or a hexagon in cross section to permit rotation with hand operated implements such as wrenches and the like.

Second section 42 includes a first hook insert 26' secured to, or formed on, the inner wall of the segment distal from a bottom end of the segment. Insert 26' has portions defining a threaded hook bore 27' configured and dimensioned to receive and engage the threads of a threaded hook rod, such as hook rod 20. Section 42 further includes a second hook insert 28' secured to, or formed on, the inner wall of the segment proximal to the bottom end of section 42. Similar to insert 26', second hook insert 28' has portions defining a second hook bore 29' formed with threading configured to receive and mate with the threading of a hook rod, such as rod 20. The hook inserts are also spaced to perform an alignment function similar to that performed by the handle inserts.

Figures 13, 14:
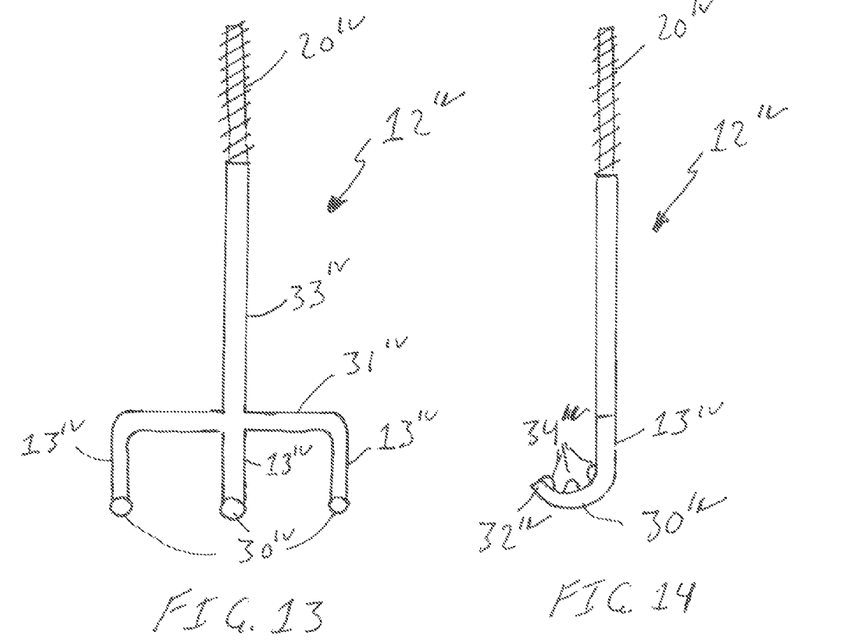
FIG. 13 is a back elevational view of a hook segment for an adjustable carry-assist apparatus according to yet another embodiment of the disclosure.
FIG. 14 is a side elevational view of the hook segment shown in FIG. 13.

Referring now to FIGS. 13 and 14, in another aspect of the disclosure, a modified modular hook segment, is shown generally as $12^{iv}$. In the embodiment shown, a plurality of spaced prongs $131^{iv}$ extend downwardly from a cross member $31^{iv}$ secured to main hook shaft $33^{iv}$ main shaft section of segment $12^{iv}$. Each prong $13^{iv}$ has a radiused bottom $30^{iv}$ that extends substantially laterally from the plane occupied by the main shaft of each prong $13^{iv}$. A distal end of bottom $30^{iv}$, bottom end $32^{iv}$, is configured to extend above the lowest point of bottom $30^{iv}$. The orientation of end $32^{iv}$ to bottom $30^{iv}$ provides an object reception surface that stabilizes the object on the apparatus when engaged with the apparatus. End $32^{iv}$ creates an opposing surface to the surface created by the transition from the elongate shaft portion of prong $13^{iv}$ to the radiused bottom $30^{iv}$. The angles formed by the centerlines of bottoms $30^{iv}$ and ends $32^{iv}$ are same as those for bottom 30 and end 32. Optional nubs $34^{iv}$ may be secured to, or formed on, the top surfaces of bottoms $30^{iv}$ and ends $32^{iv}$ so as to provide the same advantages and benefits disclosed for bottom 30 and end 32.

Figure 15:
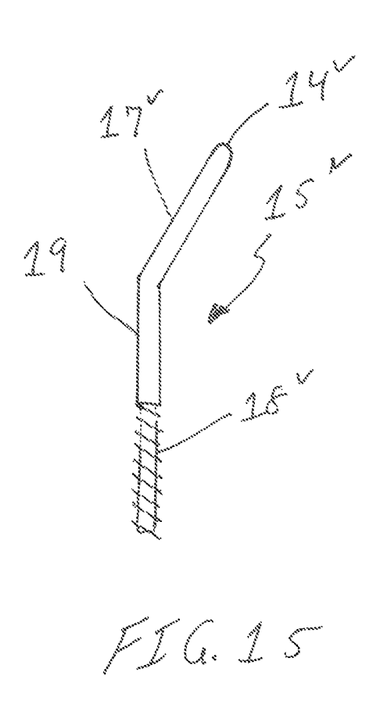
FIG. 15 is a side elevational view of a handle segment for a modular carry-assist apparatus according to another embodiment of the disclosure.

Referring now to FIGS. 15 and 16, in a yet further aspect of the disclosure, a modular handle, shown generally as $15^v$, includes a top handle shaft $17^v$ connected to a bottom handle shaft 19. The shafts are offset and occupy intersecting planes. A handle $14^v$, extends laterally from, and is integral with, or secured to, top shaft $17^v$. Extending from a bottom end of shaft 19 is handle segment rod $18^v$. Rod $18^v$ is threaded and configured to engage the threading of handle inserts in shafts 16 or 16'. Alternatively, handle $14^v$ can be configured to form a "T" with shaft $17^v$ (as shown in FIG. 1).

The components disclosed herein provide a considerable degree of variability with respect to the configuration and orientation of the components. Shaft 16' and handle $15^v$, in particular, used separately or in combination, due to their offset sections, impart substantial spatial orientation variability. By altering the rotational orientation of the assembled components, e.g., handle $15^v$ and shaft 16' with hook segment 12, an infinite number of orientations are possible to accommodate unique dimensional characteristics of any object intended to be lifted with the apparatus. The different modular hooks and handles provide additional variability. The goal, of course, is to positively and securely engage the object being lifted and to provide simultaneously, sufficient clearance to grasp the apparatus and move the object.

Assembly of the components is intended to be self-evident by virtue of their structure. All of the modular components are constructed to permit assembly by rotating the parts together by engaging the complimentary thread surfaces and counter-rotating them. The more counter-rotations, the shorter the overall apparatus length will be to accommodate shorter objects. Fewer counter-rotations may be used to maximize the apparatus length to accommodate larger or longer objects. Nuts (not shown) may be rotated onto the handle and hook rods before assembly to the shaft segment. Once the orientation of the handle segment, shaft segment and hook segment is set, the nuts may be torqued into registration with the shaft segment to releasably lock the components into a specific orientation. To disassemble the parts, the nuts are torqued away from the shaft segment and the segments are counter-rotated apart. Locking adhesives may also be used to further lock the components into specific orientations.

As should be understood, the engagement structures are intended to be illustrative only and should not be regarded as limitations to the possible connection means. Snap fit surfaces and other positive engagement means well known to those of ordinary skill in the art may also be used to connect the modular segments. Friction fit surfaces are not considered to be adequate for the intended uses of the disclosed apparatus due to the expected weight of the objects to be lifted.

The apparatus components may be constructed from any materials suitable to handle relatively heavy objects such as furniture and solid wood doors. Steel, tubular steel, iron rod, aluminum, wood and polymer materials that exhibit superior tensile strength may be used for this purpose.

To use the apparatus, a handle, a shaft segment and a hook segment are selected from the available choices based on the object to be lifted. Once assembled into one of the disclosed apparatus forms, the bottom end of the apparatus is slipped under the object to be lifted. If the object is flat on a resting surface, the object may have to be propped up first with a wedge or other height displacement device to permit insertion of the apparatus bottom under the object. The nubs and coated surfaces of the bottom ensure the object to be lifted is not damaged by the lift operation. After the bottom has been positioned under the object, the apparatus is rotated into an upright position so that the nub surfaces engage the object and temporarily fix the object in the apparatus. An upward force is applied to the handle segment to lift the object off its resting surface. After the object has been moved to a desired location, the apparatus is lowered until it separates from the object. The apparatus is then rotated and removed from under the object.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

We claim:

1. A carry assist apparatus comprising:
   a handle segment having portions defining a handle engagement surface;
   a hook segment having portions defining a hook engagement surface and portions defining a bottom and a bottom end angled upwardly from the bottom toward the handle segment; and,
   a shaft segment having portions defining a handle reception surface configured and dimensioned to receive the handle engagement surface and additional portions defining a hook reception surface configured and dimensioned to receive the hook engagement surface, wherein the shaft segment has a first section and a second section extending from, or secured to, the first section, wherein the sections are offset and occupy intersecting planes, wherein the first section has the portions defining the handle reception surface, and wherein the handle reception surface comprises at least one first shaft insert.

2. The apparatus of claim 1 wherein the at least one first shaft insert has portions defining a threaded bore dimensioned and configured to receive the handle segment.

3. The apparatus of claim 2 wherein the second section has the portions defining the hook reception surface.

4. The apparatus of claim 3 wherein the hook reception surface comprises at least one second shaft insert.

5. The apparatus of claim 4 wherein the at least one second shaft insert has portions defining a threaded bore dimensioned and configured to receive the hook segment.

6. The apparatus of claim 1 wherein the handle segment comprises:
   a top shaft and a bottom shaft extending from, or secured to, the top shaft, wherein each shaft occupies a different plane, wherein the planes intersect;
   a handle extending from the top shaft; and,
   a threaded segment extending from the bottom shaft, wherein the threaded segment is dimensioned and configured to be received by the handle reception surface.

7. The apparatus of claim 1 wherein the hook segment further comprises:
   a main hook shaft; and,
   a pair of tines diverging from the main hook shaft.

8. The apparatus of claim 7 wherein each tine comprises a bottom and a bottom end extending from the bottom and angled upwardly toward the handle segment.

9. The apparatus of claim 8 wherein at least one nub is formed on, or secured to, at least one tine bottom.

10. The apparatus of claim 1 wherein the apparatus further comprises a strap having one end secured to the hook segment and a second end secured to the handle segment.

11. The apparatus of claim 1 wherein at least one nub is formed on, or secured to, the hook segment.

12. The apparatus of claim 1 wherein the handle engagement surface defines a threaded rod.

13. The apparatus of claim 1 wherein the hook engagement surface defines a threaded rod.

* * * * *